No. 817,933. PATENTED APR. 17, 1906.
A. H. PARKER, Sr.
GRIP TREAD FOR PNEUMATIC TIRES.
APPLICATION FILED FEB. 16, 1905.
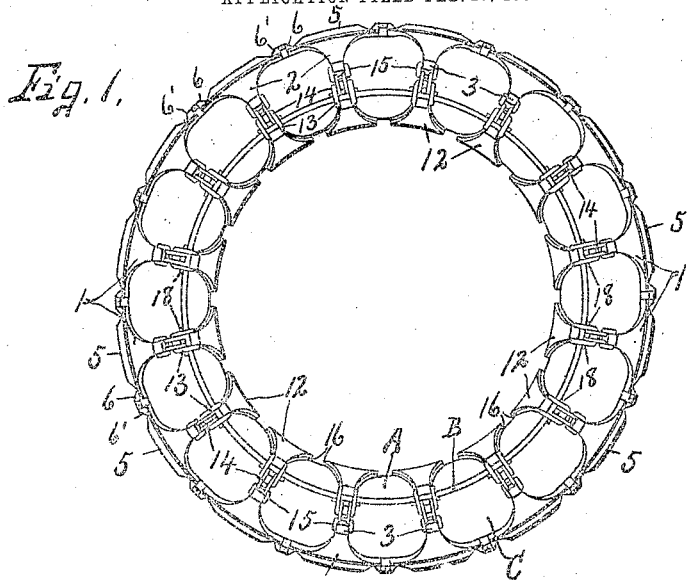
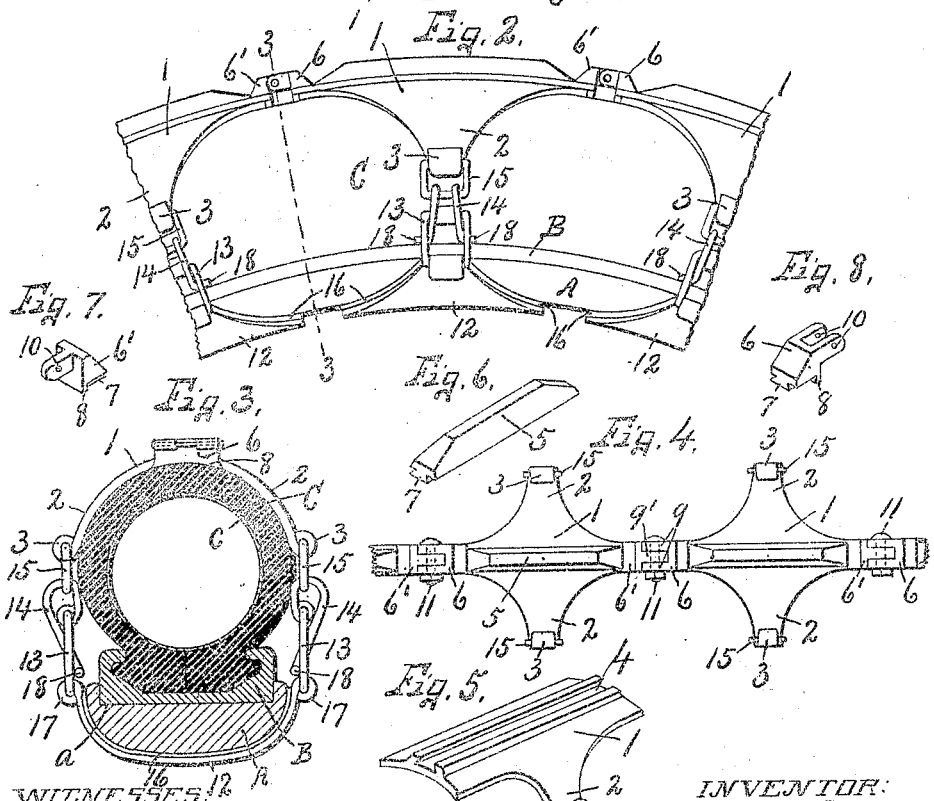

UNITED STATES PATENT OFFICE.

ARTHUR H. PARKER, SR., OF AUBURN, NEW YORK.

GRIP-TREAD FOR PNEUMATIC TIRES.

No. 817,983. Specification of Letters Patent. Patented April 17, 1906.

Application filed February 16, 1905. Serial No. 245,906.

*To all whom it may concern:*

Be it known that I, ARTHUR H. PARKER, Sr., of Auburn, in the county of Cayuga, in the State of New York, have invented new and useful Improvements in Grip-Treads for Pneumatic Tires, of which the following, taken in connection with the accompanying drawings, is a full, clear, and exact description.

This invention relates to improvements in grip-treads for pneumatic tires, and is particularly useful in affording a suitable gripping-surface to prevent circumferential and lateral slipping of the tire upon slippery pavements and also to protect the tire against undue puncture or mutilation on stony or cinder roads.

It is well known that a large percentage of automobile accidents are due to the lateral sliding or skidding of the rear wheels upon slippery pavements. These accidents frequently occur when the vehicle is turning sharp corners in the road or when traveling along the side of the road, which may be more or less inclined and slippery, thereby allowing the rear portion of the vehicle, which is usually the heaviest, to skid sidewise with sufficient force to frequently overturn the vehicle. This is also true in many instances when the vehicle is passing down a steep incline, even under slow speed, because the driver has no control whatever over the rear part of the machine, and if the road-bed happens to be inclined at the sides it is almost impossible to control the vehicle.

My object, therefore, is to provide the tire with a metal grip-tread which may be made up of a series of plates linked together circumferentially and which are detachably secured to the rim of the wheel, each plate being formed with a lengthwise rib and a transverse rib to prevent circumferential or lateral slipping of the wheels.

Another object is to assemble these longitudinal and transverse ribs, which are subjected to the greatest wear and strain, so that the ribs of any one of the plates may be removed and replaced by new ones at any time without removing the ribs of the other plate.

A still further object is to provide a separate clamping device for each plate, so that any plate may be removed independently of the others.

Other objects and uses will appear in the following description.

In the drawings, Figure 1 is an end face view of a rim and tire of a wheel, showing my improved grip-tread as applied thereto. Fig. 2 is an enlarged face view of a portion of the rim and tire and the adjacent grip-plates in operative position. Fig. 3 is a sectional view taken on line 3 3, Fig. 2. Fig. 4 is a top plan of a portion of my improved grip-tread, showing two full links or plates and the ends of the adjacent plates. Fig. 5 is a perspective view of one of the plates, showing particularly the longitudinal dovetail grooves for receiving the longitudinal and transverse ribs. Fig. 6 is a perspective view of one of the longitudinal ribs. Figs. 7 and 8 are perspective views of the transverse ribs at opposite ends of the plate.

A represents the rim of a vehicle-wheel as provided with an annular groove $a$, in which is seated a tire-clencher rim B for receiving and retaining a tire-shoe C, having an inflatable inner tube $c$, all of which parts may be of any well-known construction.

My improved grip-tread consists, essentially, of a series of metal plates 1, which are curved longitudinally and transversely to fit upon the periphery of the rubber shoe C, and each is provided with an opposite inwardly-curved wings or arms 2, having their free ends provided with suitable eyes 3 for receiving the clamping members presently described. The outer face of each plate is formed with a longitudinal dovetail groove 4, which is open from end to end for receiving a longitudinal rib 5 and transverse ribs 6 and 6', each of said ribs having its inner face provided with a dovetail projection 7, which interlocks with the dovetail groove 4. The longitudinal rib 5 is inserted into one end of the groove 4 and is moved endwise to a position substantially midway between the ends of the plate, after which the end pieces 6 and 6' are inserted in the opposite ends of the slot 4 to abut against the opposite ends of the longitudinal rib 5, the combined lengths of the longitudinal and transverse rib when thus arranged being substantially equal to the length of the plate 1, except that the transverse ribs 6 and 6' are provided with depending flanges or stop-shoulders 8, which engage the opposite end faces of said plate. As previously stated, these plates 1 are arranged end to end upon the periphery of the tire, so as to form a continuous flexible shield running circumferentially around the center of the tire, each plate having a longitudinal rib and a pair of end transverse ribs. The transverse ribs of adjacent ends of contiguous plates are provided with overlapping ears 9 and 9', having transverse apertures 10 for receiving pivotal bolts 11, whereby the interlocking transverse ribs are pivotally connected to each other. It is now clear that when these ribs are assembled upon their respective plates and the end ribs pivotally connected in the manner described a complete circular flexible shield is formed having an interior diameter of substantially the same diameter as the inflated tire, with the shoulders 8 abutting against the end faces of their respective plates and the transverse ribs of each plate abutting against the opposite ends of the longitudinal rib, so that when these transverse ribs are held by the screw-bolts 11 the longitudinal ribs are held from circumferential movement in the grooves 4 by the transverse ribs 6 and 6', and the transverse ribs are in turn held in place from circumferential movement by the longitudinal ribs and transverse shoulders 8.

In preparing and assembling the shield upon the tire the longitudinal and transverse ribs of each plate are slipped in position in the groove 4 and connected together by the bolts 11 in the manner described, leaving one of said bolts out to form a chain of plates of such a length as to fit tightly upon the periphery of the tire, whereupon this chain of plates is applied to the periphery of the tire until the end plates of the chain are brought end to end, whereupon the transverse ribs at said ends are placed in position and finally the pivotal bolt 11 inserted through the apertures 10, thereby completing the circular shield.

As previously stated, each of the shield-plates is secured in operative position by a separate clamping device, and as each clamping device is substantially of the same construction I will describe only one of them, which consists of a metal plate 12, opposite links 13, a pair of reversing links or cams 14, and an additional pair of links 15, which are hinged in the eyes 3 of the arms 2, which form a part of the plate 1. The plate 12 is curved longitudinally and transversely to conform to the curvature of the inner face of the rim A and is provided with an inner facing or cushion 16, of rubber or other yielding material, to protect the rim from being marred by contact with the metal clamping-plate 12. The opposite or transverse ends of the plate 12 are curved outwardly toward the arms 2 and are provided with eyes 17, in which the links 13 are pivoted. The cam-levers 14 are usually made of spring-wire in the form of a hook, which is pivoted at either end of the link 13 and is then passed through the link 15 and turned downwardly or inwardly, as shown in Fig. 3, to draw the plate 1 firmly upon the periphery of the tire and also to clamp it to the rim, so as to prevent circumferential movement of the shield upon the said tire. The free end of the cam-lever 14 is provided with one or more spring-arms having lateral offsets 18, which when the spring-arms are compressed are passed through the link 13 and then allowed to expand or separate, thereby throwing the offset ends 18 in behind the arms of the link 13 to hold the cam-lever against accidental displacement and to thereby prevent the accidental loosening of the grip-tread or shield and its anchor-plate 12. This is a particularly simple and effective means of securing each plate 1 to the periphery of the tire by reason of the fact that the cam-levers 14 afford a means of drawing the grip-plate 1 and anchor-plate 12 against the outer face of the tire and inner face of the rim, respectively; but it is evident that other means may be employed to secure the particular form of grip-plate to the tire without departing from the spirit of this invention, which consists, essentially, of a series of grip-plates hinged together and provided with longitudinal and transverse ribs.

The longitudinal ribs are for the purpose of preventing lateral slipping or skidding of the rear wheels, while the transverse ribs serve to prevent circumferential slipping of the tire in the propulsion of the vehicle, and either of these ribs may be removed when worn and replaced by a new one.

This grip-tread is particularly useful as an attachment for the rear driving-wheels of a vehicle, but may be also applied to the front wheels, if necessary.

Having thus described my invention, what I claim, and desire to secure by Letters Patent, is—

1. A grip-tread for tires comprising a circular series of metal plates seated on the tread of the tire and each provided with a rib having sliding interlocking connection therewith, and means for holding the plates on the tire.

2. A grip-tread for tires comprising a circular series of metal plates loosely seated on the tire and each provided with lengthwise and transverse ribs having sliding interlocking connection therewith.

3. The combination with the rim and tire of a vehicle-wheel, a series of metal plates arranged end to end upon the periphery of the tire and each provided with a longitudinal rib and a transverse rib at each end of the longitudinal rib, and separate clamping devices each including a metal plate having a cushion.

4. The combination with a rim and tire of a vehicle-wheel, of a series of metal plates applied to the periphery of the tire end to end, each plate having a longitudinal and a transverse rib, and clamping devices for said plates, each of said devices consisting of a plate passed under the rim and having its opposite sides detachably connected to the corresponding sides of the tread-plate.

5. The combination with a rim and tire of a vehicle-wheel, a series of metal plates arranged end to end around and upon the periphery of the tire, and each provided with a longitudinal and a transverse rib, of a series of clamping-plates arranged end to end around the inner face of the rim, one for each of the gripping-plates and clamping-levers connected to draw the gripping-plates and clamping-plates together against the periphery of the tire and inner face of the rim respectively.

In witness whereof I have hereunto set my hand this 9th day of February, 1905.

ARTHUR H. PARKER, Sr.

Witnesses:
H. E. CHASE,
MILDRED M. NOTT.